United States Patent [19]

Hsieh et al.

[11] Patent Number: 4,575,538

[45] Date of Patent: Mar. 11, 1986

[54] OLEFIN POLYMERIZATION

[75] Inventors: Henry L. Hsieh; Gene H. C. Yeh, both of Bartlesville, Okla.

[73] Assignee: Phillips Petroleum Company, Bartlesville, Okla.

[21] Appl. No.: 684,407

[22] Filed: Dec. 20, 1984

[51] Int. Cl.[4] .............................................. C08F 4/52
[52] U.S. Cl. .................................... 525/244; 525/260; 525/263; 526/139; 526/140; 526/141; 526/142; 526/164; 502/102
[58] Field of Search ............... 526/139, 140, 141, 142, 526/164; 525/244, 260, 263

[56] References Cited

U.S. PATENT DOCUMENTS

| | | | |
|---|---|---|---|
| Re. 28,206 | 10/1974 | Gardner et al. | 260/80.78 |
| 2,665,271 | 1/1954 | Beller | 260/88.3 |
| 2,930,785 | 3/1960 | Edmonds | 260/94.9 |
| 2,953,531 | 9/1960 | Anderson et al. | 252/429 |
| 3,030,349 | 4/1962 | Stickney et al. | 526/141 |
| 3,118,864 | 1/1964 | Robinson et al. | 260/92.3 |
| 3,147,237 | 9/1964 | Longiave et al. | 260/82.1 |
| 3,242,099 | 3/1966 | Manyik et al. | 252/429 |
| 3,282,900 | 11/1966 | Chadha et al. | 260/78.5 |
| 3,297,667 | 1/1967 | van Dublin et al. | 260/82.1 |
| 3,408,418 | 10/1968 | Iwamoto et al. | 260/680 |
| 3,429,864 | 2/1969 | Stapp | 260/94.9 |
| 3,534,009 | 10/1970 | Beresniewica | 260/87.3 |
| 3,657,205 | 4/1972 | Throckmorton | 260/82.1 |
| 3,708,551 | 1/1973 | Kittleman | 260/683 D |
| 3,786,116 | 1/1974 | Milkovich | 260/885 |
| 3,794,604 | 2/1974 | Throckmorton | 252/431 C |
| 3,803,053 | 4/1974 | Yoo | 252/429 B |
| 3,851,015 | 11/1974 | Agouri et al. | 260/878 |
| 4,152,295 | 5/1979 | Stapp | 252/430 |
| 4,242,232 | 12/1980 | Sylvester | 252/429 |
| 4,294,942 | 10/1981 | Henderson | 525/314 |
| 4,301,264 | 11/1981 | Moore et al. | 526/86 |
| 4,461,883 | 7/1984 | Takeuchi et al. | 526/139 |

FOREIGN PATENT DOCUMENTS

| | | |
|---|---|---|
| 2002003 | 2/1979 | United Kingdom . |
| 726110 | 4/1980 | U.S.S.R. . |
| 730710 | 4/1980 | U.S.S.R. . |

OTHER PUBLICATIONS

J. Polym. Sci. Poln. Letters ed., 14 477–482, 483–488, (1976).
Blodin et al., Macra Molecules, 7(2), 187 (1974).
Yen, J. Polym. Sci., 35, 533 (1959).
Yen, J. Polym. Sci., 38, 272 (1959).
J. Polym. Sci. (Polymer Chemistry Edition), 18, 3345–3357, (1980).
Macramolecules, 15, 230–233, (1982).
Polymer, 22, 1077–1080, (1981).

*Primary Examiner*—Patrick P. Garvin
*Attorney, Agent, or Firm*—Howard D. Doescher

[57] ABSTRACT

A process for producing a novel-highly active lanthanide containing catalysts comprising products formed by reacting a lanthanide halide, and an electron doner ligand with an organometal cocatalyst component and its use in the polymerization of olefins, especially olefins such as ethylene, 1,3-butadiene, isoprene and the like. In one embodiment, an organic base is used to increase catalyst activity in those instances where rare earth metal halide-ligand complex is formed with a ligand containing an acidic proton. In another embodiment, diolefins and vinyl aromatics are polymerized in a two-stage process employing a lanthanide complex-organometal cocatalyst in the first stage and a free radical initiator in the second stage.

29 Claims, No Drawings

OLEFIN POLYMERIZATION

BACKGROUND OF THE INVENTION

This invention relates to a process for producing olefin polymers and to a high activity catalyst suitable for use in the process. The present invention relates to catalyst, catalyst preparation, and catalytic polymerization.

In accordance with one aspect, this invention relates to improved olefin polymerization catalyst components produced by admixing rare earth metal halides and ligands. In accordance with another aspect, this invention relates to a catalyst system comprising a lanthanide-containing catalyst component and a cocatalyst comprising an organometal compound. In accordance with still another aspect, this invention relates to the formation of mono-olefin polymers and conjugated diene polymers in the presence of rare earth metal halide-containing catalysts produced as set forth herein.

It is old in the field of olefin polymerization to prepare solid polymers by employing catalyst systems comprising a transition metal compound and an organometallic cocatalyst. It is also known that the productivity of such catalyst can generally be improved if the transition metal compound is employed in conjunction with another metal compound. Many of the prior art catalyst systems are relatively low in activity and, as a result, research continues in an effort to improve the catalyst systems with respect to production of olefin polymers. The present invention is concerned with new high productivity catalysts which employ rare earth metal halides as one of the catalyst components for the production of polymers from olefins.

Accordingly, an object of this invention is to provide an improved polymerization catalyst.

A further object of this invention is to provide an improved process for the production of olefin polymers.

Other objects, aspects, as well as the several advantages of the invention will be apparent to those skilled in the art upon reading the specification and the appended claims.

SUMMARY OF THE INVENTION

In accordance with the invention, a lanthanide-containing catalyst component is produced by admixing a rare earth metal halide and an electron donor ligand under such conditions that a suspension of these materials is obtained.

In accordance with another embodiment of the invention, a lanthanide-containing catalyst component is combined with an organometal cocatalyst component to form a catalyst composition suitable for the polymerization of olefins.

Further in accordance with the invention, olefins and especially alpha-olefins and conjugated dienes are polymerized under polymerization conditions employing the above catalyst.

DETAILED DESCRIPTION OF THE INVENTION

The lanthanide-containing component (component A) of the polymerization catalyst of the invention is formed from a rare earth metal halide and an electron donor ligand. The complexes formed can be expressed as $MX_3 \cdot nL$ where M is a rare earth metal, n ranges from 1 to 6, L is a ligand, and X is a halogen.

Thus, in accordance with the invention, an active catalyst for polymerizing alpha-olefins, conjugated dienes and vinyl monomers comprises a rare earth metal halide associated with at least one electron donor ligand such as $C_2$–$C_{20}$ ligands comprising organic compounds containing at least one of oxygen, nitrogen, phosphorus, and sulfur, selected from carboxylic acids and acid anhydrides thereof, esters, ethers, aldehydes, ketones, diols, amines, amides, imides, oximes, ureas, phosphines, phosphites, phosphates, phosphoramides, sulfoxides, and the like, and mixtures thereof. This catalyst component is used with a cocatalyst comprising at least one organometal compound (component B).

The rare earth metal halide of catalyst component A can comprise any one of the rare earth metals of the lanthanide series, including those metals of atomic number ranging from 57-71. Suitable rare earth metal halides that can be used include neodymium chloride, neodymium iodide, gadolinium chloride, lanthanum chloride, cerium iodide, samarium chloride, as well as other halides of other rare earth metals. Chlorides and iodides are presently preferred.

The electron donor ligands that can be used according to the invention comprise any organic compound having at least one of oxygen, nitrogen, phosphorus and sulfur. These can be present in organic compounds containing up to and including about 20 carbon atoms and having various functional groups containing one of oxygen, nitrogen, phosphorus, and sulfur.

One group of organic compounds that can be used as ligands according to the invention comprises oxygen-containing organic compounds having up to and including about 20 carbon atoms per molecule. A sub-group of oxygen-containing organic compounds that can be used comprise carboxylic acids and anhydrides thereof containing a total of 2 to about 20 carbon atoms and alpha-hydroxy carboxylic acid containing from 2 to about 20 carbon atoms and mixtures thereof. Exemplary oxygen-containing ligands include hexanoic acid, decanoic acid, octadecanoic acid, succinic acid, citraconic acid, glutaric acid, maleic anhydride, succinic anhydride, decanoic anhydride, benzoic anhydride, phthalic anhydride, naphthalic anhydride, 1-naphthoic anhydride, hydroxyacetic acid, 2-hydroxyoctanoic acid, and 2-hydroxyoctadecanoic acid, and the like and mixtures thereof.

Another group of oxygen-containing ligands that can be used comprise organic compounds containing the divalent carbonyl group (C=O) present in aldehydes, ketones, 1,2-diketones, 1,3-diketones and 1,4-diketones containing from 2 to about 20 carbon atoms per radical. Exemplary compounds include acetaldehyde, benzaldehyde, acetone, 6-methyl-2-heptanone, di-n-eicosyl ketone, 2,3-butanedione, 4,5-octanedione, 2,4-pentanedione (acetylacetone), 2,4-hexanedione, 2,5-hexanedione, 3-ethyl-2,4-pentanedione, 5,5-dimethyl-1,3-cyclohexanedione, 2,5-heptanedione, 6-methyl-2,5-heptanedione, 2,5-octadecanedione, and the like and mixtures.

Still another group of organic oxygen-containing compounds that can be used include those containing hydroxyl groups present in dihydric alcohols such as diols, glycols, glycol ethers, and the like.

The ligand is one selected from a dihydric alcohol containing from 2 to about 20 carbon atoms, perferably an alkylene glycol containing about 6 to 16 carbon atoms and an aliphatic ether of alkylene glycols containing from 2 to about 6 carbon atoms. Examples of the dihydric alcohols include 1,2-ethanediol, 1,2-propanediol, 1,3-propanediol, 1,4-hexanediol, 1,10- decanediol, 1,12-dodecanediol, 1,2-hexadecanediol and 1,20-eicosanediol. Example of ethers derived from alkylene glycols include 2-ethoxyethanol (glycol monoethyl ether or ethyl cellosolve), 2-butoxyethanol, 2-phenoxyethanol, monoethyl ether of diethyleneglycol (ethyl carbitol), diethyl ether of diethylene glycol (diethyl carbitol) and the like and mixtures.

Additional organic compounds that can be used as ligands include compounds selected from the following groups:

Linear and cyclic amides or imides or ureas containing from 2 to about 20 carbon atoms such as acetamide, N,N-dimethylacetamide, succinamide, octadecanamide, succinimide, benzamide phthalimide, N-methyl-2-pyrrolidone, N-vinyl-2-pyrrolidone, N-cyclohexyl-2-pyrrolidone, N-methyl-epsilon-caprolactam, N-methyl-sigma-valerolactam, and the like and mixtures.

Cyclic and aliphatic amines having 2 or more amine groups and no other functional groups, having from 2 to about 20 carbon atoms. Cyclic amines include pyridine, 2-ethylpyridine, 2-t-butylpyridine, 4,4'-trimethyldipyridine, piperidine, and the like and mixtures. Aliphatic amines include ethylenediamine, diethylenetriamine, decaethyleneundecamine, 1,2-propanediamine, 1,3-propanediamine, benzylamine, alpha-phenylethylamine, beta-phenylethylamine, and the like and mixtures.

Alkyl or aromatic esters of linear or cyclic carboxylic acids having from 1 to about 20 carbon atoms and carbonic acid. Examples include methyl formate, ethyl octonate, n-butyl-eicosanoate, methyl anisate, ethyl benzoate, methyl-para-toluate, diethyl carbonate, methyl ethyl carbonate, di-(3-methylbutyl)carbonate, ethylene carbonate, diphenyl carbonate, and the like and mixtures.

Cyclic ethers or cyclic polyethers having from 2 to about 30 carbon atoms such as tetrahydrofuran, tetrahydropyran, 1,4-dioxane, ethylene oxide, 1,2-propylene oxide, 15-crown-5, 18-crown-6, dibenzo-[16]-crown-5, dicyclohexyl-[18]-crown-6, and mixtures. The cyclic polyethers (crown ethers) are described in J. Am. Chem. Soc. 89, 7017-7036 (1967), for example.

Linear and cyclic oximes or related oxygen-and nitrogen-containing organic compounds containing from 2 to about 20 carbon atoms such as acetoxime, methyl ethyl ketoxime, caprylaldoxime, ethyl-n-heptadecyl oxime, trans-benzaldoxime, benzophenone oxime, cyclohexanone oxime, 2-octanone oxime, pryidine-N-oxide, N,N-diethylhydroxylamine, N-phenylhydroxylamine, N-hydroxypiperidine, and the like and mixtures.

Organophosphorus compounds selected from alkyl and aromatic phosphines, phosphine oxides, phosphites and phosphates containing from 2 to about 10 carbon atoms per hydrocarbyl group. Examples include diethylphosphine, diphenylphosphine, triphenylphosphine, didecylphosphine oxide, trioctylphosphine oxide, triphenylphosphine oxide, tripiperidinophosphine oxide, trioctyl phosphite, triphenyl phosphite, tri-n-butyl phosphate, triphenyl phosphate, hexamethylphosphoramide.

Aliphatic and aromatic sulfones and sulfoxides containing from 1 to about 10 carbon atoms per hydrocarbyl group. Examples include tetramethylene sulfone, dimethyl sulfone, di-n-butyl sulfone, diphenyl sulfone, dibenzyl sulfone, dimethyl sulfoxide, diphenyl sulfoxide, dibenzyl sulfoxide, tetramethylene sulfoxide, and the like and mixtures.

A hydrocarbon polymer such as a hydroxyl-terminated polybutadiene.

A phosphorus-containing complex of the type $[(R_3PH)_3MX_6] \cdot mL$ where R is an alkyl or aryl radical containing from 1 to 10 carbon atoms, M is a rare earth element as defined before, x is halogen, preferably Cl, m is 0 to 10, L is a ligand selected from a linear or cyclic ether, an ester or an alcohol. A presently preferred compound is $[(C_6H_5)_3PH]_3 \cdot NdCl_6$ where $C_6H_5$ is phenyl.

In summary, the ligand or ligands can be selected broadly from among the following group of compounds:

1. carboxylic acids and anhydrides and hydroxycarboxylic acids, e.g., n-caproic acid, hexanoic acid, benzoic anhydride, 2-hydroxyoctanoic acid
2. aldehydes and ketones, e.g. acetone, acetylacetone, 2-octanone, benzaldehyde
3. diols and derivatives thereof, e.g. 2-ethoxyethanol, 2-phenoxyethanol, 1,2-hexadecanediol, 1,10-decanediol
4. amides and imides, e.g. N,N-dimethylacetamide, octadecanamide, N-methyl-2-pyrrolidone, N-vinyl-2-pyrrolidone, N-methyl-caprolactam, benzamide
5. amines, e.g. ethylenediamine, diethylenetriamine, 1,3-propanediamine, pyridine, trimethylenedipyridine
6. esters, e.g. ethyl octonate, ethyl benzoate, diethyl carbonate
7. ethers, e.g. tetrahydropyran, 1,2-propylene oxide
8. oximes, amino-oxides, hydroxylamines, e.g. acetophenone oxime, pyridine-N-oxide, N,N-diethylhydroxylamine, N-hydroxypiperidine
9. organic phosphorus compounds; e.g. triphenylphosphine, n-tributylphosphate, n-tributylphosphine oxide, n-trioctylphosphine oxide, triphenylphosphine oxide, tripiperidinophosphine oxide, didecylphosphine oxide, hexamethylphosphoramide
10. organic sulfur compounds, e.g. n-butyl sulfone, dibenzyl sulfoxide, tetramethylene sulfoxide, tetramethylene sulfone
11. ureas, e.g. N,N-diethylurea, tetramethylurea
12. polymers, e.g. hydroxyl terminated polybutadiene, molecular weight of about 1350.

The mole ratio of ligand to lanthanide to be employed according to the invention is in the broad range of 1 to about 30, preferably in the range of 2 to about 10.

The conditions under which the rare earth metal halide, e.g., neodymium chloride and ligand are contacted are such that a suspension is formed and these conditions generally include a broad temperature range of about 25° to about 150° C., preferably a range of about 60° to about 100° C. for a period of time ranging from about 1 minute to about 72 hours, preferably about 10 minutes to about 24 hours.

The lanthanide halide and electron donor ligand compounds are normally mixed together (Step 1) in a suitable dry solvent or diluent. Typical solvents or diluents include, for example, normally liquid hydrocarbons having 3 to 12 carbon atoms such as propane, n-pentane, cyclohexane, n-heptane, methylcyclohexane, toluene, xylenes, and the like, and mixtures thereof.

Generally the amount of solvent or diluent employed in the first step can vary over a broad range. Usually the amount of solvent or diluent is within the range of about 1/1 to about 300/1 grams of solvent per gram of rare earth metal halide, preferably in the range of about 10/1 to about 100/1 grams solvent per gram rare earth metal halide.

The lanthanide-containing catalyst component can be produced under conditions such that a suspension is formed when a ligand, a solvent or diluent and a rare earth metal halide are reacted together.

For example, in a specific preparation of the catalyst, 2 mmoles of anhydrous $NdCl_3$ was added along with 6 mmoles of ethyl anisate to a dry Diels-Alder tube under an inert gas atmosphere, e.g. argon. The mixture was diluted with 10 mL of dry cyclohexane, then heated at reflux with stirring for 24 hours. The adduct formed, or a portion thereof, can be used directly in conjunction with an organometal compound as cocatalyst in olefin polymerization. Optionally, the suspension can be filtered, the filter cake can be washed with cyclohexane and dried. The dry catalyst component can then be employed in olefin polymerization in combination with an organometal cocatalyst as described below.

The lanthanide-containing catalyst components described above can be combined with an organometal compound (Step 2) to form an active catalyst effective for the polymerization of olefins.

The organometal compound used in step 2 of the catalyst formation can be a compound derived from a metal of Groups II and IIIA of the Periodic Table. Such compounds include dihydrocarbylmagnesium compounds, e.g. di-n-butylmagnesium, and poly(hydrocarbylaluminum oxides), e.g. poly(methylaluminum oxide) or methyl aluminoxane as described in U.S. Pat. No. 3,242,099. Preferably, an organo hydrocarbylaluminum compound is employed having the formula $$RAlR'_2$$

wherein R is a hydrocarbyl radical containing 1 to about 20 carbon atoms, and each R' is a hydrocarbyl radical or alkoxide having 1 to about 20 carbon atoms, or a hydrogen atom.

Among the hydrocarbylaluminum compounds that can be used one can mention the trialkylaluminum compounds, the triarylaluminum compounds, the dialkylaluminum hydrides, the diarylaluminum hydrides, the alkylarylaluminum hydrides, the monoalkylaluminum dihydrides, the monoarylaluminum dihydrides, alkylaluminum alkoxides, dialkylaluminum alkoxides, and the like. Illustrative thereof one can mention trimethylaluminum, triethylaluminum, tripropylaluminum, triisopropylaluminum, tri-n-butylaluminum, triisobutylaluminum, trihexylaluminum, trioctylaluminum, tridecylaluminum, tridodecylaluminum, tribenzylaluminum, triphenylaluminum, trinaphthylaluminum, tritolylaluminum, dimethylaluminum hydride, diisobutylaluminum hydride, dihexylaluminum hydride, didecylaluminum hydride, diphenylaluminum hydride, dixylylaluminum hydride, dinaphthylaluminum hydride, methylphenylaluminum monohydride, ethylnaphthylaluminum monohydride, methylaluminum dihydride, ethylaluminum dihydride, butylaluminum dihydride, isobutylaluminum dihydride, octylaluminum dihydride, dodecylaluminum dihydride, phenylaluminum dihydride, tolylaluminum dihydride, naphthylaluminum dihydride, isobutylaluminum diisobutoxide, diethylaluminum ethoxide, and the like.

The organometal compound is reacted with a suspension of the product of step 1. Preferably, the hydrocarbon solution of the organometal compound is combined with a suspension of the product of step 1.

The organometal cocatalyst is used in amounts ranging from about 10 to about 200 moles per mole of lanthanide halide and in a preferred range of 20 to about 40 moles per mole of lanthanide halide. It should be noted that each mole of ligand in the catalyst inactivates one mole of organometal cocatalyst and, therefore, higher amounts of ligand will require higher amounts of organometal cocatalyst. Thus, the mole ratio of organometal cocatalyst to ligand is at least one and will preferably be in the range of about 2/1 to about 20/1 moles of organometal per mole of ligand associated with the lanthanide halide.

The temperatures employed in step 2 can vary over a wide range, generally being in the range of about 0° to about 150° C., and preferably about 25°–80° C. Following the combination of the organometal compound and the suspension of step 1, the composition is generally stirred or agitated for a sufficient time to insure complete mixing of the components, e.g., a few minutes to about 2 hours. After stirring is discontinued, the solids product is recovered by distillation under reduced pressure, by filtration or decantation, washed with a dry hydrocarbon such as n-heptane, etc., to remove any soluble material that may be present and optionally dried.

Suitable as the olefins which can be used herein are ethylene and conjugated diolefins, such as 1,3-butadiene, isoprene, trans-1,3-pentadiene; trans-1,3-hexadiene, trans-2-methyl-1,3-pentadiene; trans-3-methyl-1,3-pentadiene, 2,3-dimethyl-1,3-butadiene, trans-trans-2,4-hexadiene, and the like, and mixtures containing 2 or more polymerizable unsaturated hydrocarbons as enumerated above. A particular group of olefins to be polymerized according to the invention includes unsaturated hydrocarbons having 2 to 6 carbon atoms and having at least one polymerizable ethylene double bond.

In those instances where the rare earth metal halide-ligand complex is formed with a ligand containing an acidic proton, e.g. 1,3-diketone such as acetylacetone, carboxylic acid such as caproic acid, it may be desirable to include an organic base (as known in the art) to improve the activity of the catalyst for olefin polymerization. The organic base (adjuvant) can be added separately to the reactor or alternately the base and catalyst can be prereacted before the polymerization process. When used, the amount of organic base can range from about 0.1 to about 2 moles per mole of ligand employed in producing the complex.

The organic base is preferably chosen from primary, secondary and tertiary amines wherein each radical can contain from 1 to about 20 carbon atoms and is selected from among alkyl, aryl and alkaryl groups. Examples of suitable amines include dimethylamine, triethylamine, n-octylamine, di(n-eicosylamine), benzylamine, diethylbenzylamine, aniline, and the like and mixtures.

These polymerizable monomers are polymerized by use of a catalyst composition of the present invention whereby a polymer with the various properties depending on the type of catalyst, monomer(s), and polymerization conditions employed, e.g., the type of solvent, polymerization temperature, polymerization pressure, the ratio of organometal to lanthanide, etc., is obtained. Further, not only homopolymers can be produced from the polymerizable unsaturated monomer but also copolymers can be produced by employing a plurality of said monomers in accordance with the process of the present invention.

The polymerization reaction by use of a catalyst composition of the present invention can be carried out in the presence of a solvent or a diluent with advantages. Suitable as the solvent for the instant reaction system are inert hydrocarbons, e.g., n-butane, n-pentane, n-hexane, n-heptane, isooctane, cyclohexane, methylcyclohexane, benzene, toluene, xylene, tetralin, decalin, and other aliphatic, alicyclic, aromatic hydrocarbons, or mixtures thereof, or petroleum fractions free from polymerizable unsaturation or halogenated solvents such as tetrachloroethylene, chlorobenzene, o-dichlorobenzene and 1,2,4-trichlorobenzene. The polymerization can be carried out in gas phase in the absence of a solvent or a diluent.

The process for polymerizing olefins by use of a catalyst composition of the present invention can be carried out in a batch type, semi-continuous type, or continuous type reactor. Polymerization pressure can vary depending on the type of monomer, the catalytic activity of the catalyst system, the desired degree of polymerization, etc. Generally, the present polymerization reaction can be carried out at a temperature in the range of about 0° to about 200° C., preferably a temperature of about 25° to about 100° C. Polymerization pressure can be subatmospheric or superatmospheric pressure up to about 300 atmospheres and preferably from atmospheric pressure to about 100 atmospheres.

Generally, when using a solvent or diluent in the instant polymerization reaction, it is convenient to introduce olefin into a dispersion containing the catalyst of the present invention in the solvent or diluent. The catalyst composition can be added in its whole amount to the polymerization system at the start of the polymerization or it can be added portion-wise over the period for the polymerization.

In order to carry out the present invention by a continuous or semi-continuous process, the contact between catalyst and monomer can be effected by various ways. For example, the olefin can be contacted with the catalyst in the form of a fixed bed, a slurry, a fluid bed, or a movable bed.

The polymerization reaction can be carried out in the presence of molecular hydrogen as known in the art to regulate the molecular weight of the olefin polymers.

In order to recover a produced polymer from the polymerization system, the crude polymerization product is, for example, taken up and subjected to solvent extraction, hot filtration under a pressure or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

In another embodiment (embodiment 2) of this invention, conjugated diolefins such as 1,3-butadiene and mononvinyl aromatic compounds such as styrene are polymerized in a two stage process employing a lanthanide complex-organometal catalyst in the first stage and a free radical initiator in the second stage. The monomers can be added all at once or the conjugated diolefin can be polymerized in the first stage and the vinyl aromatic compound in the second stage. The lanthanide complex does not initiate polymerization of the vinyl aromatic monomer. High impact thermoplastic polymers such as polystyrene modified with high cis-1,4-polybutadiene can be produced, for example.

Specific examples of conjugated diolefins, vinyl aromatic compounds and polymerization conditions are given, for example, in U.S. Pat. No. 3,639,517 col 4 line 70 to column 5 line 16 and column 6 lines 14–31, which is incorporated herein by reference.

The free radical initiators suitable for employment in the second embodiment are well known compounds which are described, for example, on pages 760–764 of the 1974–1975 Modern Plastics Encyclopedia, which is incorporated herein by reference. Such compounds encompass organic peroxides, azo compounds, peroxyesters, and the like. Presently preferred, is an azo compound, particularly, 2,2-azobisisobutyronitrile.

The following examples will serve to show the present invention in detail by way of illustration and not by way of limitation.

EXAMPLE I

A series of catalysts was made employing $NdCl_3$ as the rare earth metal halide and a ligand(s) selected from carboxylic acids and anhydrides thereof and alpha-hydroxy carboxylic acids.

In separate preparations, neodymium trichloride 2 mmole, one of benzoic anhydride 6 mmole, n-caproic acid 6 mmole and 2-hydroxyoctanoic acid 6 mmole were mixed with 10 mL (7.7 g) of dry cyclohexane at reflux temperature overnight. The weight ratio of solvent to $NdCl_3$ was about 15 to 1. Each complex formed comprised 1 mole of $NdCl_3$ associated with 3 moles of the specified ligand. A portion of each resulting suspension (0.5 mL, equivalent to about 0.1 mmole of Nd complex) was employed with an organoaluminum compound as a cocatalyst in the polymerization process. Ethylene, 1,3-butadiene and isoprene were individually polymerized in a series of runs. In one set of runs, triethylamine was used as a reactor adjuvant in polymerizing isoprene.

A. ethylene polymerization

To a polymerization reactor containing 200 mL of cyclohexane was charged 2 ml (0.4 mmole) of $NdCl_3.3$ (benzoic anhydride) and 31.4 mmoles of triethylaluminum (TEA). Ethylene was introduced at a constant pressure of about 50 psia at room temperature for 7 days. The polyethylene yield was 5.3 g. The melting point of the polymer was 142° C. It was not completely soluble in 1,3,5-trichlorobenzene at 130° C. (an indication it was an ultrahigh molecular weight polyethylene) hence intrinsic viscosity was not determined.

B. 1,3-butadiene polymerization

A polymerization vessel was charged with 200 mL of cyclohexane, 16 g of 1,3-butadiene, and 0.1 mmole of $NdCl_3.3$ (benzoic anhydride) to provide about 0.6 mmole Nd catalyst per 100 parts by weight monomer (MHM) and 47 MHM (7.8 mmoles) of the specified organoaluminum compound as cocatalyst. The polymerization system was agitated in a constant temperature bath at 50° C. for 2 hours. Polymerization was terminated by addition of about 2 parts by weight butylated hydroxytoluene (BHT) per 100 parts by weight of polymer. The polymer was isolated by coagulation in isopropanol and dried overnight in vacuo at 60° C.

The results are set forth in Table 1A.

TABLE IA

| Run No. | Catalyst Type | MHM | Cocatalyst Type | MHM | Conv. % | Cis[a] % | I.V.[b] | Gel[b] % |
|---|---|---|---|---|---|---|---|---|
| 1 | NdCl$_3$.3(BA)[c] | 0.6 | TEA[d] | 47 | 40 | 94 | 7.6 | 65 |
| 2 | NdCl$_3$.3(BA)[c] | 0.6 | DEALH[e] | 47 | 32 | 94 | 2.0 | 12 |

[a]Determined as in U.S. Pat. No. 3,278,508, column 20 lines 71 ff and column 21, lines 1-21.
[b]Inherent viscosity and gel determined as in U.S. Pat. No. 3,278,508, column 20, notes a & b.
[c]Benzoic anhydride
[d]Triethylaluminum
[e]Diethylaluminum hydride.

The data in Table 1A demonstrate that polybutadiene with high cis-1,4 configuration and high molecular weight was produced based on the inherent viscosities and/or high gel content employing the inventive catalyst. The results obtained in runs 1 and 2 indicate that with a TEA cocatalyst, higher molecular weight polymer is produced at a somewhat greater conversion and high gel content relative to polymer made with a DEALH cocatalyst. Both polymers, however, had a 94% cis-1,4 microstructure.

C. Isoprene polymerization.

The polymerization vessel was charged with 200 mL of cyclohexane, 16 g of isoprene, 0.096 mole of NdCl$_3$.3(2-hydroxyoctanoic acid) or NdCl$_3$.3 (caproic acid) to provide about 0.6 mmole Nd catalyst per 100 parts monomer, TEA cocatalyst (variable) and when employed, a triethylamine adjuvant. The polymerization system was agitated at 50° C. for the specified time. Polymerization was terminated, the polymer was isolated, dried and its properties determined before. The results are given in Table 1B.

TABLE 1B

Isoprene Polymerization
0.6 MHM Nd Catalyst, TEA Cocatalyst

| Run No. | Nd Catalyst Ligand used | TEA MHM | Reactor Adjuvant Type | Reactor Adjuvant MHM | Conv. % | Cis % | I.V. | Gel % |
|---|---|---|---|---|---|---|---|---|
| 3 | 2-HOA | 19 | — | — | 24 | 94 | 2.2 | 5 |
| 4 | 2-HOA | 46 | — | — | 79 | 93 | 1.3 | 0 |
| 5 | Caproic acid | 7.6 | — | — | 0 | — | — | — |
| 6 | Caproic acid | 11 | — | — | 4 | — | — | — |
| 7 | Caproic acid | 24 | — | — | 12 | — | — | — |
| 8 | Caproic acid | 9.0 | Et$_3$N | 2.1 | 67 | 95 | 7.9 | 7 |
| 9 | Caproic acid | 14 | Et$_3$N | 2.1 | 76 | 95 | 7.7 | 8 |
| 10 | Caproic acid | 18 | Et$_3$N | 2.1 | 94 | 95 | 7.7 | 7 |

Notes:
2-HOA is 2-hydroxyoctanoic acid.
Et$_3$N is triethylamine.
Runs 3, 4 were carried out for 23 hours at 50° C.
Runs 5-10 were carried out for 20 hours at 50° C.
A dash signifies not applicable or not determined.

The result in Table 1B show that isoprene can be polymerized to polyisoprene exhibiting high cis-1,4 configuration and relatively low to high molecular weight based on the inherent viscosity and gel results depending upon the ligand employed in the NdCl$_3$ complex, the concentration of TEA cocatalyst and whether or not an organic base such as triethylamine is present as a reactor adjuvant. In the absence of organic base runs 3-7 indicate that at least about 46 MHM TEA is needed with the catalyst to achieve relatively high conversion, e.g. about 80%. However, the data in runs 3, 4 indicate that the molecular weight of the polymer is decreasing as the cocatalyst concentration is increasing. A much more active polymerization system results when a small amount of organic base is present in the reactor as runs 8-10 show. The use of organic base also permits a substantial reduction in the cocatalyst concentration. At the same time the polymer made with the system has a substantially higher molecular weight as the inherent viscosity results of about 7.7 show relative to the 1 to 2 values shown in runs 3, 4.

EXAMPLE 2

A series of catalysts was made in the manner described in Example 1 employing NdCl$_3$ as the rare earth metal halide and a ligand(s) selected from aldehydes and ketones, specifically benzaldehyde, acetylacetone, acetone and 2-octanone.

In all runs, sufficient metal complex suspension was used to provide a concentration of 0.6 MHM Nd. Each polymerization run was terminated, the polymer was isolated and its properties were determined as described before in Example 1.

A. Ethylene polymerization

Ethylene was polymerized in the manner described in Example 1 at room temperature for 7 days at a constant ethylene pressure of about 50 psia employing as catalyst 0.4 mmole of NdCl$_3$.3(benzaldehyde). The solvent used was 200 mL of cyclohexane. The cocatalyst was 31.4 mmoles of TEA. The polyethylene yield was 10.9 g. The melting point of the polymer was 143° C. It was ultrahigh molecular weight polyethylene, hence its intrinsic viscosity was not determined.

B. Diolefin polymerization with the catalysts, NdCl$_3$.3 (acetylacetone,) NdCl$_3$.3(2-octanone) and NdCl$_3$.6(acetone).

Isoprene or 1,3-butadiene was polymerized at 50° C. in 200 mL of cyclohexane employing a concentration of 0.6 MHM Nd complex as the catalyst. In part of the runs the acetylacetone complex was precontacted with 3.6 moles Et$_3$N per mole Nd before it was charged to the reactor. Generally, 16 g of the diolefin was charged to the reactor, unless specified otherwise. The polymerization time and TEA cocatalyst concentration varied as shown in the Tables.

Polymerization was terminated, each polymer was isolated and its properties were determined as set forth in Example 1.

referred to subsequently as 1,2-HEX) and 11 mmoles of diethylaluminum hydride as cocatalyst. The yield of high molecular weight polyethylene was 1.3 g. It had a melting point of 137° C. and an intrinsic viscosity of 9.8 as measured in 1,3,5-trichlorobenzene at 130° C. It was

TABLE 2A

| | | Diolefin Polymerization | | | | | | |
|---|---|---|---|---|---|---|---|---|
| Run No. | Diolefin | Nd Catalyst Ligand | TEA MHM | Et$_3$N Adjuvant MHM | Time Hrs | Conv. % | Cis % | I.V. | Gel % |
| 1 | butadiene | ACAC$^{(a)}$ | 19 | 0 | 48 | 0 | — | — | — |
| 2 | butadiene | ACAC | 19 | 4.3 | 48 | 15 | — | — | — |
| 3 | butadiene | ACAC | 19 | 8.6 | 48 | >0 | — | — | — |
| 4 | butadiene | ACAC + Et$_3$N | 14 | 0 | 6 | 96 | 97 | 7.9 | 53 |
| 5 | butadiene | ACAC + Et$_3$N | 19 | 0 | 6 | 100 | 96 | 7.5 | 40 |
| 6 | butadiene | ACAC + Et$_3$N | 24 | 0 | 6 | 100 | 95 | 7.4 | 34 |
| 7 | isoprene | ACAC + Et$_3$N | 19 | 0 | 6 | 75 | 94 | 6.1 | — |
| 8 | isoprene | 2-octanone$^{(b)}$ | 7.6 | 0 | 18 | 50 | 95 | 6.3 | 6 |
| 9 | isoprene | 2-octanone$^{(b)}$ | 11.3 | 0 | 18 | 66 | 95 | 6.4 | 25 |
| 10 | isoprene | acetone$^{(c)}$ | 14 | 0 | 20 | 25 | 95 | 5.6 | 6 |
| 11 | isoprene | acetone$^{(c)}$ | 18 | 0 | 20 | 26 | 95 | 5.4 | 7 |

$^{(a)}$NdCl$_3$.3(acetylacetone) catalyst
$^{(b)}$NdCl$_3$.3(2-octanone) catalyst
$^{(c)}$NdCl$_3$.6(acetone) catalyst Run 1 of Table 2A shows that the NdCl$_3$.3ACAC catalyst is not active in polymerizing 1,3-butadiene in the presence of 19 MHM TEA under the conditions used. Some polymerization activity is realized by the separate addition of about 4 MHM Et$_3$N to the reactor as demonstrated in run 2 where a 15% conversion is obtained after 48 hours. However, doubling the Et$_3$N concentration to about 8 MHM dropped the activity to zero. Runs 4-7 show that treating 1 mole of the NdCl$_3$.3ACAC complex with 3.6 moles Et$_3$N results in a composition with substantial increase in catalytic activity as reflected by conversions ranging from 75 to 100% after 6 hours on stream. The polymers made in this system were high in molecular weight as shown by inherent viscosity values ranging from about 6 to 8 and gel content ranging from 6 to 53%. The polymers were also predominantly cis-1,4 in configuration, e.g. 94-97% cis-1,4. Runs 8-11 show that the NdCl$_3$.6(acetone) complexes are active catalysts for the production of high molecular weight, high cis-content isoprene polymers in the presence of a TEA cocatalyst and in the absence of Et$_3$N.

EXAMPLE 3

A series of catalysts was made in the manner described in Example 1 employing as the rare earth metal halide, one of NdCl$_3$, NdI$_3$ and GdCl$_3$. The ligand is one selected from 1,10-decanediol, 1,12-dodecanediol, 1,2-hexadecanediol, 2-ethoxyethanol(glycol monoethyl ether or ethyl cellosolve), 2-butoxyethanol, and 2-phenoxyethanol.

Ethylene, 2-3-dimethyl-1,3-butadiene, trans-2,trans-4-hexadiene, trans-2-methyl-1,3-pentadiene, 1,3-butadiene and isoprene were individually polymerized in a series of runs employing a portion of the catalyst, an organoaluminum compound as cocatalyst and cyclohexane as solvent. Unless specified otherwise sufficient metal complex suspension was used to provide a concentration of 0.6 MHM rare earth metal. The resulting polymers were isolated and their properties determined as before.

A. Ethylene polymerization

Ethylene was polymerized in the manner described in Example 1 at room temperature for 8 hours employing as catalyst 0.15 mmole of NdCl$_3$.3(1,2-hexadecanediol, determined that the weight average molecular weight was 291,000 and the number average molecular weight was 15,100. Dividing the first value by the second value gives 19.3, the heterogeneity index (HI). The value obtained indicates a broad molecular weight distribution polymer was obtained. A value of 6 to 8, for example, such as one obtained in ethylene polymerization with a Ti-containing catalyst and organoaluminum cocatalyst is indicative of a much narrower molecular weight distribution polymer. Broad molecular weight distribution polymers are of particular value in blow molding applications.

B. Diolefin polymerization with NdCl$_3$.3(Diol) catalyst and TEA cocatalyst and the diol is specified later.

1. 2,3-dimethyl-1,3-butadiene (20 g) was polymerized in 200 mL of cyclohexane at 50° C. for 60 hours employing 18.6 MHM of TEA as cocatalyst and 0.6 MHM NdCl$_3$.3(1,2-HEX) as catalyst. The polymer formed was insoluble in the polymerization medium. The polymer was isolated as before. It was determined that conversion was 20%. The melting point of the polymer was 195° C. as determined by conventional differential scanning calorimetry (DSC) means, e.g. ASTM D 3417-75. The white, crystalline polymer was found to have very high 1,4-configuration with essentially no 1,2-isopropenyl groups present as determined by conventional nuclear magnetic resonance (NMR) methods using a commercially available instrument sold for such a purpose. Based on melting point, the 1,4-configuration of the polymer is primarily cis in nature.

2. Isoprene (16 g) was polymerized in separate runs at 50° C. for 18 hours in 200 mL of cyclohexane employing 0.6 MHM NdCl$_3$.3(1,2-HEX) as catalyst and TEA (variable) as cocatalyst. Isoprene (16 g) was also polymerized in separate runs at 50° C. for 23 hours in 200 mL of cyclohexane employing 0.6 MHM NdCl$_3$.3(1,12-dodecanediol, subsequently referred to as 1,12-DOD) as catalyst and TEA (variable) as cocatalyst. In another series, isoprene (16 g) was polymerized at 50° C. for 21 hours employing 0.6 MHM NdCl$_3$.3(1,10-decanediol, subsequently referred to as 1,10-DOD) as catalyst and TEA (variable) as cocatalyst. The resulting polymers were recovered and tested as before. The results are given in Table 3A.

TABLE 3A

Isoprene Polymerization
NdCl₃.3 (Diol) Catalyst

| Run No. | Nd Catalyst Diol | TEA MHM | Conv. % | Cis$^{(a)}$ % | I.V. | Gel % | Mw · 10⁻³ Mn · 10⁻³ | HI |
|---|---|---|---|---|---|---|---|---|
| 1 | 1,2-HEX | 9.3 | 96 | 97 | 2.2 | 0 | 360/165 | 5.5 |
| 2 | 1,2-HEX | 18.6 | 98 | 97 | 1.4 | 0 | 210/105 | 2 |
| 3 | 1,12-DOD | 9.3 | 100 | 97 | 1.9 | 0 | 243/64 | 3.8 |
| 4 | 1,10-DOD | 18.6 | 100 | 97 | 1.4 | 0 | 171/44 | 3.9 |
| 5 | 1,10-DOD | 9.3 | 78 | 95 | 3.8 | 0 | —$^{(b)}$ | — |
| 6 | 1,10-DOD | 18.6 | 90 | 94 | 2.2 | 0 | — | — |

$^{(a)}$balance is 3,4-configuration
$^{(b)}$a dash signifies no determination.

3. Trans-2,trans-4-hexadiene(10 g) was polymerized in 100 mL of cyclohexane at 50° C. for 72 hours employing 2 MHM NdCl₃.3(1,2-HEX) as catalyst and 78 MHM of TEA as cocatalyst. The polymer was recovered, dired and found to weigh 7.2 g (72% conversion). Infrared and NMR analyses indicated the microstructure of the polymer to be essentially trans-1,4. The inherent viscosity of the polymer when measured in toluene at 25° C. was 0.31 dL/g. Its number average molecular weight (Mn) was 16,000 and its weight average molecular weight (Mw) was 27,000 as determined by gel permeation chromatography (GPC). The melting point of the polymer was broad (60°-80° C.) and weak as determined by DSC which indicated a low crystallinity. The glass transition temperature, Tg, was determined to be −11° C. by means of a Rheovibron instrument (Imass, Inc., Accord, Mass.), ASTMD4065-82, temperature of E" maximum (loss modulus).

4. Trans-2-methyl-1,3-pentadiene (5 g) was polymerized in 100 mL of cyclohexane at 50° C. for 48 hours employing 1 MHM NdCl₃.3(1,2-HEX) as catalyst and 140 MHM of TEA as cocatalyst. The polymer was isolated and dried as before and found to weight 3.7 g (74% conversion). Carbon-13 NMR spectra showed the microstructure of the polymer to be essentially of 1,4-addition, 38% cis and 62% trans. The inherent viscosity of the polymer when measured in toluene at 25° C. was 0.23 dL/g. GPC measurements showed a Mn of 13,000 and Mw of 19,000. Tg, was determined by a Rheovibron instrument, was found to be −2° C.

C. 1,3-butadiene polymerization with MX₃3.(1,2-HEX) and TEA cocatalyst (variable). M is Nd or Gd, X is Cl or I.

1. 16 g of 1,3-butadiene was polymerized in 200 mL of cyclohexane for 17 hours at 50° C. employing as catalyst 0.3 MHM of GdCl₃.3(1,2-HEX) and TEA (variable).

2. In another series, 16 g of 1,3-butadiene was polymerized in 200 mL of cyclohexane for 19 hours at 50° C. employing 0.6 MHM of NdI₃.3(1,2-HEX) as catalyst and TEA (variable) as cocatalyst. The polymers were recovered and tested as before. The results are given in Table 3B.

TABLE 3B 1,3-Butadiene Polymerization
MX₃.3(1,2-HEX) Catalyst

| Run No. | Catalyst MX₃.(1,2-HEX) (MX₃) | TEA MHM | Conv. Conv. % | Cis. Cis % | I.V. | Gel % | $M_w/M_n$$^{(a)}$ | HI |
|---|---|---|---|---|---|---|---|---|
| 7 | GdCl₃ | 9.3 | 0 | —$^{(b)}$ | — | — | — | — |
| 8 | GdCl₃ | 28 | 11 | 90 | 1.6 | 0 | — | — |
| 9 | GdCl₃ | 46 | 14 | 88 | 1.8 | 0 | — | — |
| 10 | NdI₃ | 9.2 | 71 | 92 | 2.7 | 0 | 912/214 | 4.3 |
| 11 | NdI₃ | 18.4 | 52 | 91 | 3.0 | 0 | 697/79 | 8.8 |

$^{(a)}$Multiply value with 10³ to obtain molecular weight.
$^{(b)}$A dash signifies no determination.

The results in Tables 3A, 3B demonstrate that active diolefin polymerization catalysts can be made with rare earth halide-diol complexes used in combination with an aluminum alkyl cocatalyst. Various long chain diols are seen to be about equal in performance when complexed with NdCl₃ as evidenced by the results given in runs 1-6 of Table 3A. Table 3B in runs 7-9 shows that Gd-based catalysts are less active than Nd-based catalyst but that relatively active catalysts are possible especially when high levels of aluminum alkyl cocatalysts are also present. Runs 10-11 of Table 3B indicate that iodine can be substituted for chlorine as the halogen without adversely affecting conversion or high cis content. However, runs 10, 11 show polymer molecular weight appears to be substantially increased by using NdI₃ relative to runs 1,2 of Table 3A where NdCl₃ is used as the rare earth halide.

D. Isoprene polymerization with NdCl₃.3(2-hydrocarbyloxyethanol where hydrocarbyloxy is one of ethoxy, butoxy or phenoxy).

1. In one series, 16 g of isoprene was polymerized in 200 mL of cyclohexane for 23 hours at 50° C. employing as catalyst 0.6 MHM of NdCl₃.3(2-ethoxyethanol) and TEA (variable).

2. In another series, 16 g of isoprene was polymerized in 200 mL of cyclohexane for 23 hours at 50° C. employing as catalyst 0.6 MHM of NdCl₃.3(2-butoxyethanol) and TEA (variable).

3. In the final series, 16 g of isoprene was polymerized in 200 mL of cyclohexane for 17 hours at 50° C. employing as catalyst 0.6 MHM of NdCl₃.3(2-phenoxyethanol) and TEA (variable) as catalyst. The polymers were recovered and tested as before. The results are presented in Table 3C.

TABLE 3C

Isoprene Polymerization
NdCl₃.3 (2-hydrocarbyloxyethanol) Catalyst

| Run No. | Nd Catalyst Ligand | TEA MHM | Conv. % | Cis % | I.V. | Gel % |
|---|---|---|---|---|---|---|
| 12 | 2-ethoxyethanol | 4.7 | 0 | — | —[a] | — |
| 13 | 2-ethoxyethanol | 9.4 | 43 | 95 | 2.7 | 4 |
| 14 | 2-ethoxyethanol | 14 | 68 | 94 | 2.7 | 3 |
| 15 | 2-butoxyethanol | 9.4 | 52 | 95 | 2.9 | 12 |
| 16 | 2-butoxyethanol | 19 | 78 | 92 | 2.2 | 4 |
| 17 | 2-phenoxyethanol | 4.7 | 4 | 95 | 1.9 | 11 |
| 18 | 2-phenoxyethanol | 9.4 | 23 | 95 | 4.0 | 9 |
| 19 | 2-phenoxyethanol | 14 | 28 | 94 | 3.6 | 8 |

[a] A dash signifies no determination.

The results in Table 3C indicate that the invention catalysts employed produce polyisoprene having high cis-configuration and likely high molecular weight based on the inherent viscosity results of about 2–4 along with some gel as shown in runs 13–19.

EXAMPLE 4

A series of catalysts was prepared in the manner described in Example 1 employing as the rare earth metal halide, NdCl₃, or as specified. The ligand employed was a compound selected from ethylenediamine, 1,3-propanediamine, 4-t-butylpyridine, ethyl octonate, ethyl benzoate, diethyl carbonate, propylene oxide, acetophenone oxime, N,N-diethylhydroxylamine, triphenylphosphine, tributyl phosphate, trioctylphosphine oxide, hexamethylphosphoramide, tripiperidinophosphine oxide, tetramethylene sulfone, dimethyl sulfoxide, hydroxy-terminated, liquid polybutadiene, molecular weight of about 1350, hydroxyl value of 1.2 meq/g), [(C₆H₅)₃PH]₃NdCl₆, octadecanamide, N-vinyl-2-pyrrolidone, N,N'-diethylurea.

A. 10 g of 3-methyl-1,3-pentadiene (mixture of about 10% cis and 90% trans isomers) was polymerized in 100 mL of cyclohexane at 50° C. for 72 hours employing 1 MHM NdCl₃.3(ethyl benzoate) as catalyst and as cocatalyst 65 MHM of triisobutylaluminum (TIBAL) and 90 MHM of DEALH. The polymer was isolated and dried as before. Conversion was 25%. The inherent viscosity of the polymer when measured in toluene at 25° C. was 3.7. By GPC it was determined that Mn was 101,000 and Mw was 1,200,000. The HI(Mw/Mn) is calculated to be 11.9, indicating a relatively broad molecular weight distribution polymer was made. Tg, as determined by the Rheovibron, was −6° C. The microstructure of the polymer as determined from NMR spectra was found to be 65% cis-1,4-addition and 35% trans-1,2-addition.

B. 5 g of 1,3-hexadiene (predominantly trans isomer) was polymerized in 100 mL of cyclohexane at 50° C. for 120 hours with 2 MHM NdCl₃.3(ethyl benzoate) as catalyst and 186 MHM of TEA as cocatalyst. The polymer was recovered and dried as usual. Conversion was 96%. Tg, as determined with the Rheovibron, was −30° C. Infrared analysis of the polymer showed both cis-1,4 and trans-1,2 structures were present. Carbon-13 NMR spectra showed the microstructure of the polymer consisting of 56% cis-1,4, 23% trans-1,2, 14% trans 1,4 and 7% cis-1,2.

C. Isoprene and/or 1,3-butadiene were individually polymerized in a series of runs at 50° C. for the indicated times using portions of the catalysts equivalent to 0.6 MHM of rare earth metal and an organometal compound as cocatalyst. Unless specified otherwise, 16 g of the diolefin was charged to reactor along with 200 mL of cyclohexane as the solvent. Each polymer was isolated and its properties determined as before. The results are given in Tables 4A, 4B, 4C.

B. Ethylene polymerization

In a one liter reactor containing 400 mL of cyclohexane under dry nitrogen was charged 0.4 mmole of NdCl₃3(ethyl benzoate) and 15.7 mmoles of triethylaluminum as cocatalyst. Ethylene was introduced at a constant pressure of 455 l psia at 100° C. for 1 hour. The yield of recovered polyethylene was determined to be 26.6 g. The melting point of the polymer by DSC was 134° C. Its melt index (MI) was zero according to ASTM D 1238, condition E and its high load melt index (HLMI) was determined to be 0.2 g/10 minutes according to ASTM D 1238, condition F. The melt index values obtained indicate the polymer had a very high molecular weight.

In another run duplicating the previous one except that the reactor contained 55 psia of hydrogen (0.15 mole) and the total pressure was maintained at 455 psia by charging ethylene as before. The yield of recovered polyethylene was found to be 16 g. Its melting point by DSC was 138° C. The MI of the polymer was determined to be 0.35 g/10 minutes and its HLMI was 13.4 g/10 minutes. A lower molecular weight polyethylene was produced in the presence of hydrogen and the lanthanide catalyst based on the higher melt index results relative to those obtained in the absence of hydrogen.

TABLE 4A

Diolefin Polymerization
MX₃.3 (Ligand) Catalyst

| Run No. | Diolefin | Ligand | Run Time Hrs | Cocatalyst Type | MHM | Conv. % | Cis % | I.V. | Gel % |
|---|---|---|---|---|---|---|---|---|---|
| 1 | butadiene | ED[a] | 25 | DIBH[b] | 15 | 96 | 98 | 3.9 | 48 |
| 2[c] | butadiene | ED[a] | 20 | TIBA[d] | 27 | 22 | 98 | 5.9 | 9 |
| 3 | butadiene | PD[e] | 5 | TEA[f] | 19 | 84 | 94 | 6.3 | 3 |
| 4 | isoprene | TBP[g] | 18 | TEA[f] | 9.3 | 96 | 96 | 2.7 | 4 |
| 5 | isoprene | EOC[h] | 18 | TEA[f] | 9.3 | 86 | 96 | 7.4 | 0 |
| 6 | isoprene | DED[i] | 18 | TEA[f] | 19 | 12 | 96 | 6.2 | 10 |

TABLE 4A-continued

Diolefin Polymerization
MX₃.3 (Ligand) Catalyst

| Run No. | Diolefin | Ligand | Run Time Hrs | Cocatalyst Type | MHM | Conv. % | Cis % | I.V. | Gel % |
|---|---|---|---|---|---|---|---|---|---|
| 7 | butadiene | PO[j] | 20 | TEA[f] | 28 | 31 | 92 | 4.5 | 13 |

[a] ethylenediamine
[b] diisobutylaluminum hydride
[c] M is samarium in run 2. M is Nd in remainder.
[d] triisobutylaluminum
[e] 1,3-propanediamine
[f] triethylaluminum
[g] 4-t-butylpyridine
[h] ethyl octonate
[i] diethyl carbonate
[j] propylene oxide

TABLE 4B

Diolefin Polymerization
NdCl₃.3 (Ligand) Catalyst

| Run No. | Diolefin | Ligand | Run Time Hrs | Cocatalyst Type | MHM | Conv. % | Cis % | I.V. | Gel % |
|---|---|---|---|---|---|---|---|---|---|
| 8 | isoprene | ACPO[a] | 23 | TEA | 9.4 | 48 | 96 | 4.7 | 7 |
| 9 | butadiene | NNDH[b] | 18 | TEA | 19 | 24 | 94 | 5.0 | 27 |
| 10 | butadiene | TPP[c] | 55 | DEAH[d] | 42 | 22 | 97 | 6.8 | 35 |
| 11 | butadiene | TPP[c] | 55 | DEAC[e] | 46 | 0 | — | — | — |
| 12 | butadiene | TBP[f] | 0.75 | MAL[g] | 4.4 | 46 | 96 | 9.0 | 31 |
| 13 | isoprene | TOPO[h] | 18 | TEA | 9.3 | 58 | 92 | 1.9 | 0 |
| 14 | butadiene | HMPA[i] | 3.5 | TEA | 9.0 | 29 | 96 | 6.7 | 34 |
| 15 | isoprene | TPPPO[j] | 18 | TEA | 9.3 | 45 | 92 | 5.3 | 7 |

[a] acetophenone oxime
[b] N,N—diethylhydroxylamine
[c] triphenylphosphine
[d] diethylaluminum hydride
[e] diethylaluminum chloride
[f] tributyl phosphate
[g] methyl aluminoxane, made by reacting ca 1 mole water per mole trimethylaluminum
[h] trioctylphosphine oxide
[i] hexamethylphosphoramide
[j] tripiperidinophosphine oxide

TABLE 4C

Diolefin Polymerization
NdCl₃.3 (Ligand) Catalyst

| Run No. | Diolefin | Ligand | Run Time Hrs | Cocatalyst Type | MHM | Conv. % | Cis % | I.V. | Gel % |
|---|---|---|---|---|---|---|---|---|---|
| 16 | butadiene | TMS[a] | 20 | TEA | 19 | 26 | 97 | 6.8 | 30 |
| 17 | butadiene | DMSO[b] | 18 | TEA | 11.3 | 40 | 96 | 6.7 | 34 |
| 18 | butadiene | PBDOH[c] | 16 | TEA | 9.3 | 75 | 97 | 7.5 | 50 |
| 19 | butadiene | TPPC[d] | 18 | TEA | 19 | 29 | 97 | 5.0 | 40 |
| 20 | butadiene | ODA[e] | 4 | TEA | 9.0 | 100 | 94 | 3.3 | 19 |
| 21 | isoprene | NVP[f] | 23 | TEA | 46 | 56 | 93 | 5.3 | 15 |
| 22 | isoprene | NNDU[g] | 3.5 | TEA | 9.4 | 57 | 96 | 6.6 | 6 |

[a] tetramethylene sulfone
[b] dimethyl sulfoxide
[c] hydroxy-terminated, liquid polybutadiene, molecular weight of about 1350, hydroxyl value of 1.2 meq/g, 0.8 MHM concentration
[d] [(C₆H₅)₃PH]₃NdCl₆, Nd concentration of 1.0 MHM
[e] octadecanamide
[f] N—vinyl-2-pyrrolidone
[g] N,N'—diethylurea.

The results given in Tables 4A, 4B, 4C demonstrate that active diolefin polymerization catalysts can be made by combining a rare earth metal halide with a ligand selected from a variety of compounds. Suitable cocatalysts can be selected from various organoaluminum compounds including trialkylaluminums, dialkylaluminum hydrides and alkyl aluminoxanes such as methyl aluminoxane. However, based on the negative results shown in run 11, Table 4B with diethylaluminum chloride as the cocatalyst it appears that alkylaluminum halides may not be suitable as cocatalysts with the specified invention catalysts under the conditions employed. The invention catalyst systems characteristically produce high molecular weight, high cis configuration polymers.

EXAMPLE 5

Example 5 relates to embodiment 2 described hereinbefore wherein a 2-stage polymerization process is employed to produce a polymeric, thermoplastic composition comprising a mixture of homopolymers, a block copolymer and/or a graft copolymer depending upon reaction conditions. For example, a polymeric composition can be made comprising polystyrene intimately mixed with a high cis-1,4-polybutadiene elastomer.

In stage 1, the reactor was charged with 200 mL of cyclohexane, 6.2 g of 1,3-butadiene and 0.15 mmole of Nd as a complex comprising 1 mole of $NdCl_3.3$(1,2-hexadecanediol) prereacted with 25 moles of triisobutylaluminum. Polymerization was carried out at 50° C. for 17 hours as described in Example 1 resulting in essentially 100% conversion of the diolefin. The reactor was then charged with 32 g of styrene which was admixed with the rubber cement contained therein and 0.1 g of the free radical initiator 2,2-azobisisobutyronitrile (AIBN) as a toluene solution containing 0.05 g AIBN per mL of solution. Polymerization in stage 2 was carried out at 50° C. for 24 hours. The product was isolated by coagulation, dried and several properties determined by conventional analyses. It was determined that overall conversion of 23% was achieved. The composition comprised 28.2 weight polymerized styrene which was in block form and the balance, 71.8 weight percent, was high cis-1,4-polybutadiene, e.g. based on earlier examples to be about 95% cis-1,4 configuration. The inherent viscosity of the product was found to be 2.4 in toluene.

Other tests indicated that the Nd catalyst would not initiate polymerization of styrene. Therefore, if desired, stage 1 polymerization can be carried out with the Nd catalyst in the presence of both 1,3-butadiene and styrene.

We claim:

1. A process for the polymerization of olefins which comprises contacting at least one olefin under polymerization conditions in the presence of an organic base with a catalyst composition comprising a rare earth metal halide-ligand complex (component A) formed by admixing a rare earth metal halide and an electron donor ligand containing an acidic proton in a solvent or diluent to form a suspension of the complex and an organometal compound (component B).

2. A process according to claim 1 wherein said organic base is chosen from primary, secondary, and tertiary amines wherein each radical can contain from 1 to about 20 carbon atoms.

3. A process according to claim 2 wherein the amount of amine present ranges from about 0.1 to about 2 moles per mole of ligand employed to form the complex.

4. A process according to claim 1 wherein said solvent or diluent is a normally liquid hydrocarbon having from 3 to 12 carbon atoms.

5. A process according to claim 1 wherein said organo metal compound is an organoaluminum compound having the formula $RAlR'_2$ wherein R is a hydrocarbyl radical containing 1 to about 20 carbon atoms, and each R' is a hydrocarbyl radical or alkoxide having 1 to about 20 carbon atoms, or a hydrogen atom.

6. A process according to claim 1 wherein said ligand is selected from the group consisting of (1) carboxylic acids and anhydrides thereof and alpha-hydroxy carboxylic acids containing a total of 2 to about 20 carbon atoms, and (2) organic compounds containing the divalent carbonyl group (C=O) selected from aldehydes, ketones, 1,2-diketones, 1,3-diketones and 1,4-diketones containing from 2 to about 20 carbon atoms.

7. A process according to claim 1 wherein said olefin comprises butadiene or isoprene.

8. A process according to claim 7 wherein said rare earth metal halide is neodymium chloride and said ligand is 2-hydroxyoctanoic acid, caproic acid or acetylacetone.

9. A process according to claim 8 wherein said organometal compound is triethylaluminum and said organic base is triethylamine.

10. A process for the production of polymers of conjugated diolefins and vinyl-substituted aromatic compounds which comprises polymerizing monomers of diolefins and vinyl-substituted aromatic compounds under polymerization conditions in a two stage process by contacting at least one of said monomers in the presence of an organic base in a first stage with a catalyst composition comprising a rare earth metal halide-ligand complex (component A) formed by admixing a rare earth metal halide and an electron donor ligand containing an acidic proton in a solvent or diluent to form a suspension of the complex and an organometal compound (component B) and then contacting the product of said first stage with at least one vinyl-substituted aromatic monomer and a free radical initiator in a second stage.

11. A process according to claim 10 wherein said organic base is chosen from primary, secondary, and tertiary amines wherein each radical can contain from 1 to about 20 carbon atoms.

12. A process according to claim 11 wherein the amount of amine present ranges from about 0.1 to about 2 moles per mole of ligand employed to form the complex.

13. A process according to claim 10 wherein said solvent or diluent is a normally liquid hydrocarbon having from 3 to 12 carbon atoms.

14. A process according to claim 10 wherein said organometal compound is an organoaluminum compound having the formula $RAlR'_2$ wherein R is a hydrocarbyl radical containing 1 to about 20 carbon atoms, and each R' is a hydrocarbyl radical or alkoxide having 1 to about 20 carbon atoms, or a hydrogen atom.

15. A process according to claim 10 wherein said ligand is selected from a group consisting of (1) carboxylic acids and anhydride thereof and alpha-hydroxy carboxylic acids containing a total of 2 to about 20 carbon atoms, and (2) organic compounds containing the divalent carbonyl group (C=O) selected from aldehydes, ketones, 1,2-diketones, 1,3-diketones and 1,4-diketones containing from 2 to about 20 carbon atoms.

16. A process according to claim 10 wherein said diolefin is 1,3-butadiene or isoprene and said aromatic compound is styrene.

17. A process according to claim 10 wherein monomers comprising both said diolefin and aromatic compounds are introduced into said first stage wherein a polymer of said diolefin is formed and a polymer of said aromatic compound is formed in said second stage.

18. A process according to claim 10 wherein said diolefin is introduced into said first stage to form a polymer thereof and said aromatic compound is introduced into said second stage to form a polymer thereof.

19. A process for the production of high molecular weight olefin polymers which comprises contacting ethylene under polymerization conditions with a catalyst composition consisting essentially of a rare earth metal halide-ligand complex (component A) formed by admixing a rare earth metal halide and an electron donor ligand in a solvent or diluent to form a suspension of the complex and an organometal compound (component B) having the formula $RAlR'_2$ wherein R is a hydrocarbyl radical containing 1 to about 20 carbon atoms, and each R' is a hydrocarbyl radical or alkoxide having 1 to about 20 carbon atoms, or a hydrogen atom.

20. A process according to claim 19 wherein said ligand is selected from the group consisting of (1) carboxylic acids and anhydrides thereof and alpha-hydroxy carboxylic acids containing a total of 2 to about 20 carbon atoms, and (2) organic compounds containing the divalent carbonyl group (C=O) selected from aldehydes, ketones, 1,2-diketones, 1,3-diketones and 1,4-diketones containing from 2 to about 20 carbon atoms, (3) dihydric alcohols selected from diols, glycols and glycol ethers having from 2 to about 20 carbon atoms, and (4) alkyl or aromatic esters of linear or cyclic carboxylic acids having from 1 to 20 carbon atoms.

21. A process according to claim 20 wherein said metal halide is neodymium chloride and said ligand is benzoic anhydride, benzaldehyde, 1,2-hexadecanediol or ethyl benzoate.

22. A process according to claim 21 wherein said organometal is triethylaluminum or diethylaluminum hydride.

23. A process according to claim 22 wherein said solvent or diluent is a normally liquid hydrocarbon having from 3 to 12 carbon atoms.

24. A process according to claim 23 wherein said hydrocarbon is cyclohexane.

25. A process for the production of polymers of conjugated diolefins and vinyl-substituted aromatic compounds which comprises polymerizing monomers of diolefins and vinyl-substituted aromatic compounds under polymerization conditions in a two stage process by contacting monomer of diolefin or a mixture of monomer of diolefin and monomer of vinyl-substituted aromatic in a first stage with a catalyst composition comprising a rare earth metal halide-ligand complex (component A) formed by admixing a rare earth metal halide and an electron donor ligand in a solvent or diluent to form a suspension of the complex and an organometal compound (component B), and then contacting the product of said first stage with monomer of at least one vinyl-substituted aromatic and a free radical initiator in a second stage.

26. A process according to claim 25 wherein said organometal compound is an organoaluminum compound having the formula $RAlR'_2$ wherein R is a hydrocarbyl radical containing 1 to about 20 carbon atoms, and each R' is a hydrocarbyl radical or alkoxide having 1 to about 20 carbon atoms, or a hydrogen atom.

27. A process according to claim 26 wherein said diolefin is 1,3-butadiene or isoprene and said aromatic compound is styrene.

28. A process according to claim 25 wherein monomers comprising both said diolefin and aromatic compounds are introduced into said first stage to form a polymer of said diolefin and a polymer of said aromatic compound is formed in said second stage.

29. A process according to claim 25 wherein said diolefin is introduced as monomer into said first stage to form a polymer thereof and said aromatic compound is introduced as monomer into said second stage to form a polymer thereof.

* * * * *